US008323721B2

(12) United States Patent
Nakhasi et al.

(10) Patent No.: US 8,323,721 B2
(45) Date of Patent: Dec. 4, 2012

(54) PHYTOSTEROL ESTERIFICATION PRODUCT AND METHOD OF MAKING SAME

(75) Inventors: Dilip K. Nakhasi, Bourbonnais, IL (US); Roger L. Daniels, Manhattan, IL (US); Joshua Eartly, Wilmington, IL (US)

(73) Assignee: Bunge Oils, Inc., St. Louis, MO (US)

( * ) Notice: Subject to any disclaimer, the term of this patent is extended or adjusted under 35 U.S.C. 154(b) by 149 days.

(21) Appl. No.: 12/428,387

(22) Filed: Apr. 22, 2009

(65) Prior Publication Data

US 2009/0238942 A1 Sep. 24, 2009

Related U.S. Application Data

(62) Division of application No. 11/315,616, filed on Dec. 22, 2005.

(51) Int. Cl.
*A23D 9/007* (2006.01)

(52) U.S. Cl. .................................. 426/611; 426/612

(58) Field of Classification Search .................. 426/601, 426/611, 612
See application file for complete search history.

(56) References Cited

U.S. PATENT DOCUMENTS

| 1,972,459 A | 9/1934 | Pungs et al. |
| 2,128,925 A | 9/1938 | Epstein |
| 2,309,949 A | 2/1943 | Gooding |
| 2,320,844 A | 6/1943 | Black |
| 2,383,632 A | 8/1945 | Trent |
| 2,494,366 A | 1/1950 | Sprules et al. |
| 2,588,435 A | 3/1952 | VanLoon |
| 2,648,692 A | 8/1953 | Mertzweiller |
| 4,218,334 A * | 8/1980 | Lundmark ............ 516/75 |
| 4,371,470 A | 2/1983 | Matsukura et al. |
| 4,391,732 A * | 7/1983 | Lundmark ............ 516/72 |
| 4,526,725 A | 7/1985 | Deardorff |
| 4,698,186 A | 10/1987 | Jeromin et al. |
| 5,264,367 A | 11/1993 | Aalrust et al. |
| 5,288,884 A | 2/1994 | Cooper |
| 5,324,853 A | 6/1994 | Jones et al. |
| 5,399,731 A | 3/1995 | Wimmer |
| 5,434,279 A | 7/1995 | Wimmer |
| 5,434,294 A | 7/1995 | Pugach et al. |
| 5,442,081 A | 8/1995 | Behr et al. |
| 5,473,089 A | 12/1995 | Gutsche et al. |
| 5,532,163 A | 7/1996 | Yagi et al. |
| 5,723,639 A | 3/1998 | Datta et al. |
| 5,898,077 A | 4/1999 | Takahara et al. |
| 5,917,068 A | 6/1999 | Barnicki et al. |
| 5,986,117 A | 11/1999 | Cooper |
| 6,001,640 A | 12/1999 | Loeffler et al. |
| 6,002,030 A | 12/1999 | Valbert |
| 6,031,118 A * | 2/2000 | van Amerongen et al. ... 552/544 |
| 6,103,505 A | 8/2000 | Clausen et al. |
| 6,106,886 A | 8/2000 | Van Amerongen et al. |
| 6,117,475 A | 9/2000 | Van Amerongen et al. |
| 6,127,137 A | 10/2000 | Hasida et al. |
| 6,140,094 A | 10/2000 | Loffler et al. |
| 6,143,545 A | 11/2000 | Clausen et al. |
| 6,231,915 B1 * | 5/2001 | van Amerongen et al. ... 426/611 |
| 6,258,869 B1 | 7/2001 | Shah et al. |
| 6,413,571 B1 | 7/2002 | Liu |
| 6,440,057 B1 | 8/2002 | Erfun et al. |
| 6,514,739 B1 | 2/2003 | Udagawa et al. |
| 6,531,463 B1 | 3/2003 | Yliruusi et al. |
| 6,538,146 B2 | 3/2003 | Turck |
| 6,589,588 B1 * | 7/2003 | Wester et al. ............. 426/607 |
| 6,596,886 B1 | 7/2003 | Cecchi |
| 6,610,868 B2 | 8/2003 | Saebo et al. |
| 6,713,466 B2 * | 3/2004 | Milstein et al. ............. 514/182 |
| 6,753,032 B1 | 6/2004 | Hirokawa et al. |
| 6,759,225 B2 | 7/2004 | Udagawa et al. |
| 6,762,313 B2 | 7/2004 | Strube et al. |
| 6,770,768 B2 | 8/2004 | Wester |
| 6,800,317 B2 | 10/2004 | Wester |
| 6,822,105 B1 | 11/2004 | Luxem et al. |
| 6,855,837 B2 * | 2/2005 | Ekblom ............. 552/544 |
| 6,929,816 B2 * | 8/2005 | Wester ............. 426/607 |
| 6,956,125 B2 * | 10/2005 | Wollmann et al. ......... 552/545 |
| 6,989,456 B2 * | 1/2006 | Seo et al. ............. 552/544 |

(Continued)

FOREIGN PATENT DOCUMENTS

| EP | 0 285 196 | 10/1988 |
| EP | 0369516 | 5/1990 |
| EP | 1 512 325 | 3/2005 |
| EP | 1 839 496 | 10/2007 |
| WO | WO 98/006405 A1 | 2/1998 |
| WO | WO 98/42214 | 10/1998 |
| WO | WO 01/091587 A1 | 12/2001 |
| WO | WO 2005/063950 A1 | 7/2005 |

OTHER PUBLICATIONS

Anon. 2004-2005. TCI America Organic Chemicals Catalog. TCI America, Portland, Oregon, p. 1615.*
Swern, D. 1979. Bailey's Industiral Oil and Fat Products, vol. 1, 4th edition. John Wiley & Sons, New York, p. 416, 315.*
Ferrari, R. et al. 1997. Journal of Agricultural and Food Chemistry 45:4753.*
Kuksis, A. 1960. J. Organic Chemistry 25:1209.*
Kuksis, A. 1960. Journal of Organic Chemistry 29:1209.*
Hsieh, C. 1980. Journal of Food Science 45:523.*
Leeson, P. 2002. Food Research International 35:983.*
Spizzirri, John, "The Phytosterol Story," Food Product Design: Functional Foods Annual, Nov. 2000 Weeks Publishing Co., Northbrook, Illinois.

(Continued)

*Primary Examiner* — Carolyn Paden
(74) *Attorney, Agent, or Firm* — Jones Day

(57) ABSTRACT

An ingredient suitable for use in the manufacture of specialty margarines and bakery shortenings with nutritional and functional benefits is the reaction product of a phytosterol material esterified with a saturated fatty acid material. The reaction product is substantially solid at ambient temperature, and thus is suitable for use as an ingredient in solid shortening products, yet without the adverse health effects believed to be associated with saturated fatty acids. In the method of making the product, the esterification reaction is carried out at elevated temperatures, under vacuum, and for a relatively longer duration than prior art procedures. The esterification reaction may be carried out in the presence of a catalyst and optionally, high oleic canola oil. The reaction product is neutralized, then filtered at least once and preferably twice to remove any residual catalyst.

10 Claims, 3 Drawing Sheets

U.S. PATENT DOCUMENTS

| | | | |
|---|---|---|---|
| 7,226,771 B2 | 6/2007 | Gramatikova et al. | |
| 7,312,062 B2 | 12/2007 | Bojsen et al. | |
| 2002/0010349 A1* | 1/2002 | Roden et al. | 552/544 |
| 2002/0045773 A1* | 4/2002 | Ekblom | 552/544 |
| 2002/0058827 A1* | 5/2002 | Wollmann et al. | 552/545 |
| 2002/0131991 A1* | 9/2002 | Milstein et al. | 424/439 |
| 2003/0144165 A1 | 7/2003 | Roggen | |
| 2003/0175404 A1 | 9/2003 | Nakhasi et al. | |
| 2003/0229238 A1 | 12/2003 | Fleisher | |
| 2004/0005399 A1 | 1/2004 | Chakrabati et al. | |
| 2004/0005604 A1 | 1/2004 | Gramatikova et al. | |
| 2004/0047971 A1* | 3/2004 | Alander | 426/601 |
| 2004/0087809 A1 | 5/2004 | Nakayama et al. | |
| 2004/0219277 A1 | 11/2004 | Wester | |
| 2005/0014826 A1 | 1/2005 | Smith et al. | |
| 2005/0038270 A1 | 2/2005 | Flickinger et al. | |
| 2005/0075509 A1 | 4/2005 | Luxem et al. | |
| 2005/0080280 A1 | 4/2005 | Yoo | |
| 2005/0171368 A1 | 8/2005 | Westfechtel et al. | |
| 2005/0176977 A1 | 8/2005 | Horlacher et al. | |
| 2005/0196766 A1 | 9/2005 | Soe et al. | |
| 2005/1096512 | 9/2005 | Nakhasi et al. | |

OTHER PUBLICATIONS

"Institute of Food Science & Technology: Information Statement on Phytosterol Esters," Jan. 2005, Institute of Food Science & Technology, London, UK.

Moreau, Robert, "Phytosterols and Phytosterol Esters," Technical abstract, Book Chapter, Apr. 4, 2005.

Allen, Robert R. et al., Bailey's industrial Oil and Fat Products, vol. 2, Fourth edition, pp. 113-118.

* cited by examiner

PHYTOSTEROL ESTERIFICATION PRODUCT AND METHOD OF MAKING SAME

RELATED APPLICATIONS

This application is a divisional of U.S. patent application Ser. No. 11/315,616, filed Dec. 22, 2005, entitled "Phytosterol Esterification Product And Method Of Making Same", the disclosure of which is incorporated herein by reference in its entirety.

FIELD

This invention relates to a class of phytosterol esters that are useful as ingredients in food products. More particularly, this invention relates to a class of phytosterol esters that are useful as ingredients in the preparation of specialty shortening products with nutritional and functional benefits, and that are substantially solid at ambient temperatures, and to methods of their manufacture.

BACKGROUND OF THE INVENTION

The term "phytosterols" as used herein covers both plant sterols, plant stanols, wood sterols, and wood stanols. Plant sterols are naturally occurring substances that are components of edible vegetable oils. Plant stanols, occurring in nature at a lower level, are saturated fatty acid compounds of the respective plant sterols. Wood sterols and wood stanols are also naturally occurring substances that are present in whole or in part from tall oil, a product derived during the processing of paper from wood. Commercial quantities of plant stanols are derived from the process of catalytic hydrogenation.

The use of phytosterols and phytosterol esters as cholesterol lowering adjuncts in a variety of food products has been well documented. As reported by the Institute of Food Science and Technology, sterols dissolved in edible fat products have been found to be more effective at reducing blood cholesterol levels than sterols in crystalline form. It is difficult to incorporate free sterols into edible fats or oils because of their insolubility, whereas sterols esterified to fatty acids are more fat soluble. The enrichment of foods such as margarines with phytosterols is one of the recent developments in functional foods to enhance the cholesterol-lowering ability of traditional food products.

While phytosterols possess desirable qualities in terms of potential for lowering cholesterol, they can pose challenges in the manufacture of food products for consumer use. While conventional fatty acids tend to form round crystal structures that promote spreadability and ease of handling, phytosterols tend to form sharp needle-like crystals at ambient temperatures that result in a brittle product. Such a product can be difficult for a manufacturer to work with, and can be less desirable to a consumer when used in products such as spreads Typically, phytosterol esters are created by esterifying a phytosterol material with relatively high levels of mono- and polyunsaturated fatty acids, and with the fatty acids of long-chain triglycerides. Such products will be very viscous at 40° F., but can range from viscous to liquid at ambient temperature. These products are well suited for use in dressings and similar products, but may not be suitable for use in those applications in which the ingredient should be substantially solid at ambient temperature, such as margarine-type products and bakery shortenings, where hardness at room temperature can make them undesirable.

U.S. Pat. No. 6,106,886 discloses a process for the preparation of stanol fatty acid esters having any desired fatty acid groups, the preparation comprising the interesterification of stanol fatty acid esters with a source for one or more fatty acid moieties of a desired composition. Such sources for fatty acid moieties preferably contain high amounts of polyunsaturated fatty acid moieties.

U.S. Pat. No. 6,117,475 discloses fat based food products having an optimal ratio of free and esterified sterols, such products not showing instability and/or crystal formation.

U.S. Pat. No. 6,531,463 discloses a method of making a homogeneous and stable paste by mixing β-sitosterol and a food grade oil, heating until all the solids are dissolved in the oil, cooling the mixture, and adding water to disperse it.

U.S. Pat. No. 6,753,032 discloses a "plant sterol-containing fat composition . . . comprising a plant sterol fatty acid ester (A); and from 10 to 70% by weight of a partial glyceride (B)." The composition can be made by "effecting the esterification reaction of a plant sterol, and a partial glyceride and/or triglyceride under solventless conditions by using a lipase or an alkali as a catalyst." (Col. 2, lines 32-42)

U.S. Pat. No. 6,800,317 discloses sterol and/or stanol fatty acid ester compositions, in which more than 50% of the fatty acid moieties comprises polyunsaturated fatty acids, and less than 7% comprises saturated fatty acids, and the composition shows no texturizing properties.

US 2004/0219277 discloses a fat blend including a reduced level of a conventional hardstock rich in absorbable saturated or a trans-unsaturated fat, wherein the solid fat component is composed of either fully a phytosterol ester or ester blend, defined as a texturizing agent, or of a blend of the texturizing agent and conventional hardstock.

US 2005/0038270 discloses a process for preparing sterol and stanol esters using a base-catalyzed transesterification of the free sterols with fatty acid glycerides coupled to removal of the produced glycerol under vacuum.

WO 98/06405 discloses a stanol composition containing sitostanol and a substantial amount of at least 10% campestanol; the composition can be esterified to provide a substance that can be used in fat-containing foods.

WO 01/91587 A2 discloses an oil composition comprising triglycerides bearing short and medium chain fatty acid residues derived from fatty acids having from 4 to 14 carbon atoms and long chain fatty acid residues derived from fatty acids having from 15 to 22 carbon atoms.

Bailey's Industrial Oils and Fat Products, vol. 2, $4^{th}$ ed., edited by Daniel Swern, at pp. 113-124 discloses the background of esterification and a general process for carrying out esterification reactions.

It is thus an object of the invention to provide a phytosterol based product that is substantially solid at room temperature, so as to be suitable for use in margarine and/or bakery shortenings.

It is another object of the invention to provide a phytosterol-based product that is substantially solid at room temperature, and that provides greater cholesterol-lowering potential than standard saturated fats that are solid at room temperature.

It is still another object of the invention to provide a phytosterol based product that is substantially solid at room temperature, and yet is spreadable at room temperature, so as to be useful in spreads and other food products desirable to consumers.

It is another object of the invention to provide a method for making such a phytosterol product.

SUMMARY OF THE INVENTION

The present invention relates to a composition suitable for use as an ingredient for a food product, the composition comprising the esterification product of a phytosterol material and at least one saturated fatty acid, the esterification product being substantially solid at ambient temperature. The esterification can be carried out in the presence or absence of a catalyst. The esterification preferably is conducted under vacuum to remove the moisture evolved during the esterification reaction. The product can be filtered one or more times to remove residual catalyst. The product is suitable for use in the production of shortening and bakery margarines with enhanced health benefits to the consumer, while having a crystal morphology that provides for a product that can be spreadable at room temperature.

The present invention further relates to a method for making such a composition. In accordance with the invention, the method comprises: providing a quantity of a phytosterol material, a quantity of at least one saturated fatty acid, and a source of hydroxyl moieties, and forming a mixture thereof; heating the mixture to a temperature of about 230-250° C.; maintaining the temperature of the mixture for a time sufficient for esterification to take place; neutralizing the mixture; filtering the mixture; and cooling the mixture to ambient, such that the composition becomes substantially solid. The esterification can be carried out in the presence of a catalyst, and preferably is conducted under vacuum to remove the moisture evolved during the esterification reaction. The process can be carried out using a concentrated approach, in which the reaction mixture comprises about 60-75% of phytosterol and about 20-30% of saturated fatty acid, or the reaction can be carried out using a dilute approach, in which the mixture comprises about 50-59% of phytosterol and about 40-47% saturated fatty acid.

DETAILED DESCRIPTION OF THE INVENTION

Figure 1:
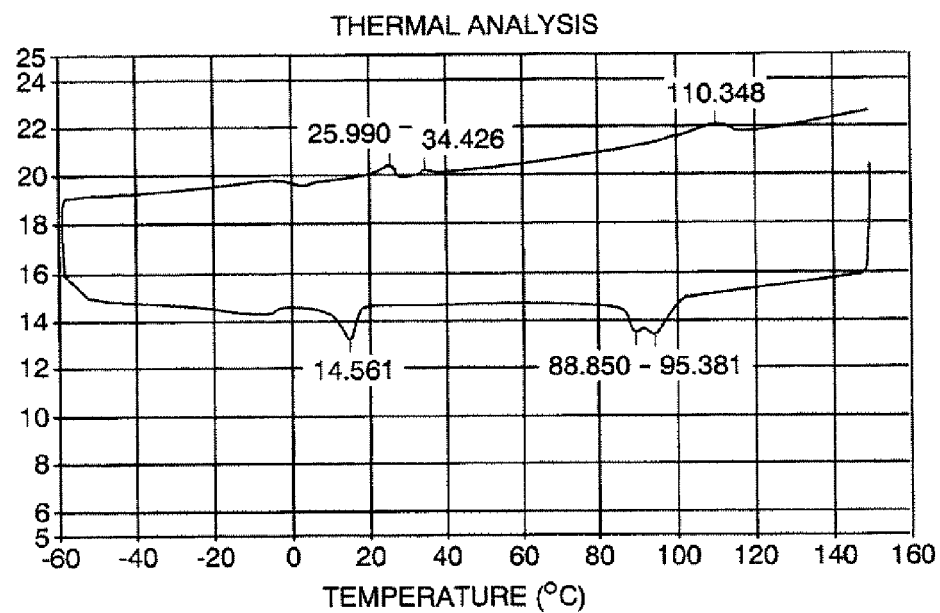
FIGS. 1-5 are differential scanning calorimetry curves for the products of Examples 3, 4a, 6, 7, and 8, respectively.

In the description below, all values stated as a percent are in terms of weight percent unless indicated otherwise.

The present invention relates to a composition suitable for use as an ingredient for a food product, the composition comprising the esterification product of a phytosterol material and at least one saturated fatty acid, the esterification product being substantially solid at ambient temperature. Depending on the desired purpose, the product can be provided in the form of a block or slab of material, or the product can be comminuted into flakes, beads, or a powder.

The phytosterol material used in the present invention can be derived from either a vegetable product or a wood product. Vegetable oils that yield phytosterols include soy, canola, sunflower, cottonseed, corn, safflower, and other vegetable oils. The phytosterol materials used in the present invention can be one or more of the oils themselves, or they can be one or more phytosterol materials that are derived from these vegetable oils, and may include varying quantities of sitosterol, campesterol, stigmasterol, brassicasterol, stimasterol, and ergosterol. Any of these components can be present in any proportion in the phytosterol materials useful in the present invention. The phytosterol materials used in the present invention also may be derived in whole or in part from tall oil, a product derived from paper processing from wood. It is to be understood that when referring to phytosterols, the corresponding phytostanols also are intended to be included within the scope of the invention.

In accordance with the invention, the phytosterol material is esterified with at least one saturated fatty acid. The preferred saturated fatty acids for use in the present invention will be those having between 2 and 24 carbon atoms. The saturated fatty acids can be linear molecules with acid moieties on one or both ends. Alternatively, the fatty acids can be non-linear, with one or more branches or side chains. The most preferred acids include acetic, butyric, caproic, caprylic capric, lauric, mysteric, palmitic, and stearic, arachidic, henicosanoic, behenic, and lignoceric, although other acids can be used. The acids can be short chain, medium chain, or long chain. Also, a mixture of saturated fatty acids may be used, such as are found naturally occurring in certain vegetable oil products. The oils can be derived from either domestic sources, or from off shore sources typically referred to as tropical sources. Such natural sources of saturated fatty acids include fractions of palm oil, palm kernel oil, cottonseed oil, soybean oil, coconut oil, corn oil, canola oil, high oleic canola oil, low linoleic soy oil, medium chain triglycerides, and other vegetable and animal source edible oils. The "oil" as described herein may be present in either the liquid or the solid form. If present in the solid form, it is desirable to work with the material in a subdivided form, such as flakes. Palm stearin flakes have been found to be particularly useful for this purpose.

In a preferred embodiment of the invention, the method comprises: providing a quantity of a phytosterol material, a quantity of at least one saturated fatty acid, and glycerin as a source of hydroxyl moieties, and forming a mixture thereof. These materials are charged to a reaction chamber. In a preferred embodiment of the invention, an amount of high oleic canola oil ("HOC") also is added to the esterification reaction chamber. The purpose of the HOC is to provide additional stable fatty acids, and to enhance fluidity of the reaction mixture during the esterification process, particularly at the relatively higher temperatures found most useful in the practice of the present invention.

The esterification can be carried out in the presence of a catalyst. The most preferred catalyst is stannous chloride. Other suitable esterification catalysts include the platinum titanates and sodium methoxides. If a catalyst is used, the mixture in the reaction chamber is brought to a temperature of about 150-170° C., preferably about 160° C. and the catalyst is then added to the reactor chamber. The catalyst can be added in an amount of about 0.1% of the total reaction mixture.

The mixture is then heated to a temperature of about 180-250° C., preferably about 230-240° C., and the temperature of the mixture is maintained for a period of time sufficient for esterification to take place. The duration of the reaction will depend on the particular phytosterol material used, the particular fatty acid material used, the quantities of the materials, and whether or not a catalyst is present. Typical esterification reaction times are about 2.5-5, preferably about 3-4 hours, and most preferably about 3.5 hours when the reaction is conducted in the presence of a catalyst; the reaction time can be up to seven hours or longer if a catalyst is omitted.

The esterification preferably is conducted under vacuum to remove the moisture evolved during the esterification reaction. Preferred vacuum pressures are in the range of about 2.5 mbars or less. The vacuum pressure will be sufficient to remove evolved moisture such that the moisture remaining in the product at the end of the full process is less than about 4000 ppm, preferably less than about 3000 ppm, and most preferably less than about 2000 ppm.

The degree of esterification will depend on the reaction temperature, the use of a catalyst, and the duration of the reaction. It has been found that with the method of the present invention, the degree of esterification can be increased form about 45% with prior art methods to about 70-88% with the method as described above. This provides much greater efficiency in the manufacturing process.

When esterification is complete, the temperature of the reaction mixture is reduced to about 125-135° C., preferably 130° C. If a catalyst has been used during the esterification process, then the catalyst can be neutralized with a known neutralizing agent such as citric acid. The neutralizing agent may typically contain about 42% citric acid. The neutralizing agent may be added in an amount of about 0.7-1.5%, and preferably about 1% of the total mixture. Suitable neutralizing agents include those compounds that will form chelates with the catalyst to stop the catalytic action. Besides citric acid, other suitable neutralizers include ascorbic acid, and very dilute mineral acids such as hydrochloric acid, phosphoric acid, and sulfuric acid. The neutralization step is allowed to continue for a period of time sufficient to effectively neutralize the catalyst. Typically, the neutralization step will continue for about 20-40 minutes, preferably about 30 minutes. It will be appreciated that if less neutralizer is used, the neutralization step will proceed for a longer time. If no catalyst was used, the neutralization step can be omitted.

When the catalyst has been neutralized, the reaction mixture is treated with a silica-based adsorbent to adsorb unwanted alkaline materials that may persist in the mixture. Micronized silica beads hydrated with 60% $H_2O$ are suitable for this purpose; one such adsorbent is sold under the trade name Trisyl S-615 by W.R. Grace & Co. It is also helpful to add a small quantity of a diatomaceous earth product to remove residual fatty acids. The diatomaceous earth product prevents formation a gel with the silica of the adsorbent, and aids in the filtration process. One suitable diatomaceous earth (Filter Aid) product is sold under the trade name Hi Flo Supercel by Celite Corp. The adsorbent and diatomaceous earth are added to the mixture and mixed for about 10 minutes, the mixture is then filtered to remove any residual catalyst and remaining moisture, along with the adsorbent and the diatomaceous earth. Preferably, the filtered material then is treated with bleaching clay and with more Filter Aid for about another 10 minutes, and then filtered again. The two filtering steps are desirable to remove traces of the stannous chloride catalyst. In the final product, the residual catalyst is preferably less than about 10 ppm, more preferably less than about 5 ppm, and most preferably less than about 1 ppm, measured as tin.

Following filtration, the material is subjected to a deodorization process of the type well known in the edible oil processing arts. In a preferred embodiment, the deodorization step is carried out at a temperature of about 230-240° C., under a vacuum of about 0.2-2.5 mbars, with steam introduced at 0.4% (w/w) per hour. The deodorization step is carried out for about 4-5 hours. The deodorization step removes any remaining free fatty acids, peroxides, and color bodies. When this step is completed, the mixture is cooled, resulting in a substantially solid product.

The resulting product is suitable for use in the production of shortening and bakery margarines with enhanced health benefits to the consumer, while providing seed crystals for plasticity. Without being bound by theory, it is presently believed that the esterified saturated fatty acids have lower bio-availability in a food product than free saturated fatty acids; i.e., they will not be absorbed by the digestive system as readily as the free fatty acids. Yet when present in esterified form in the products of the present invention, the saturated fatty acids still provide the functional properties to the products that makes them suitable for use as specialty shortenings for a variety of different food applications. Specifically, the products have more spreadability at room temperature than standard phytosterol products, due to the nature of their crystal morphology. This spreadability makes it easier for the manufacturer to work with the product, both in the manufacture of the product itself and in the manufacture of food products made from the phytosterol product. This spreadability also makes food products made from the phytosterol product of the invention more desirable to consumers. A spread product that remains hard even at room temperature will not be enjoyed by most consumers, but food products using the phytosterol products of the present invention can be more spreadable and thus preferred by consumers.

In one embodiment of the inventive method, the phytopowder constituent is more concentrated in the reaction mixture. In this embodiment, in terms of the esterification reaction mixture, the phytosterol material makes up about 60-75%, the fatty acid material makes up about 20-30%, the hydroxyl source makes up about 2-5%, and the high oleic canola makes up 0-15%. In another embodiment of the inventive method, the phytopowder constituent is less concentrated in the reaction mixture. In this embodiment, in terms of the esterification reaction mixture, the phytosterol material makes up about 50-59%, the fatty acid material makes up about 40-47%, the hydroxyl source makes up about 2-5%, and the high oleic canola makes up 0-10%. Operating at more dilute levels rather than more concentrated levels of phytosterol may provide certain process advantages A higher concentration of phytosterols would make the product more brittle, while in the dilute approach a lower concentration of phytosterols makes the product softer and easier to work with.

Operating at different concentration levels and different reaction parameters also can offer the manufacturer the opportunity to pre-select certain properties in the final product, such as color and melt profile. Specifically, although the end products of the inventive process will be substantially solid at ambient temperatures, they can be relatively softer or harder, and soften at different temperatures. Such differing functional product properties can find utility in different end uses, such as all-purpose shortenings, cake and icing shortenings, confectionery coatings, and the like. Melting curves and cooling curves can be obtained through differential scanning calorimetry to demonstrate the different properties of the different esterification products of the present invention over a range of temperatures. Phytosterol ester products made with the present inventive method have a melting point in the range of about 115-135° C.

The method of the invention is set forth in the following examples, which are intended to illustrate various embodiments of the invention. It will be understood that the invention is not, however, limited to the particular illustrated embodiments. In each of the following examples, the phytosterol used was in the form of a phytopowder commercially available from Procter & Gamble Food Ingredients and sold under the trade name Nutraphyl™ Phytosterols. For those examples for which differential scanning calorimetry curves and data are presented, the curves were obtained on a Perkin-Elmer Model Pyris 1DSC differential scanning calorimeter, on a sample of about 6-8 milligrams, over a temperature range of −60-160 C. The sample was held for 10.0 minutes at 150 C, then cooled form 150 C to −60 C at 10 C per minute. The samples were then held at −60 C for 30 minutes, and heated from −60 C to 150 C at 5 C per minute. In each figure, the horizontal axis is a range of temperatures, and the vertical axis is heat flow, measured in milliwatts.

EXAMPLE 1

A mixture of 60% phytopowder, 38% palm flakes and 2% glycerin was charged to a reaction flask with a nitrogen sparge, an agitator, and a stainless steel temperature probe. This same reaction flask with nitrogen sparge, agitator, and temperature probe was used in each of the following examples. The mixture was brought to a temperature of about 160° C., and stannous chloride catalyst was added. The temperature was brought to about 180-210° C. and the esterification reaction was allowed to proceed for about 2.5 hours under vacuum. Difficulties were noted with effective removal of evolved steam during the esterification reaction. The reaction mixture then was treated with 0.7% citric acid neutralizing agent for about 10 minutes. The neutralized material was treated with Filter Aid and Bleaching clay for about 10 minutes, and then filtered. It was determined that the esterification reaction was 44.6% complete. The final product had 8.35 ppm tin as residual catalyst, and 0.3% moisture.

EXAMPLE 2

A mixture of 75% phytopowder, 20% palm flakes and 5% glycerin was charged to the reaction flask. The mixture was brought to a temperature of about 160° C., and stannous chloride catalyst was added. The method was carried out as described above except that the temperature of the esterification reaction was in the range of about 180-230° C., and steam was more effectively removed by use of two cold fingers. It was determined that the esterification reaction was 48.3% complete. The final product had 34.90 ppm tin as residual catalyst.

EXAMPLE 3

A mixture of 60% phytopowder, 20% palm flakes, 15% high oleic canola oil and 5% glycerin was charged to the reaction flask. The mixture was brought to a temperature of about 160° C., and stannous chloride catalyst was added. The method was carried out as described above, except that the temperature of the esterification reaction was in the range of about 180-225° C., and the neutralization reaction time was increased to about 20 minutes. It was determined that the esterification reaction was only 6.9% complete. The final product had 1.01 ppm tin as residual catalyst.

A differential scanning calorimetry analysis for this product is shown in FIG. 1. It may be seen that the melting curve show a first peak at about 26 C, followed by a second peak at about 34 C, and a final peak at about 110 C. The cooling curve shows a first peak at about 95 C, a second peak at about 89 C, followed by a third peak at abut 14.5 C. It may be seen that the peaks are relatively broad, indicating more gradual transitions between substantially liquid and substantially solid states.

EXAMPLE 4

A mixture of 51% phytopowder, 47% palm flakes, and 2% glycerin were charged to the reaction flask. The mixture was brought to a temperature of about 160° C., and stannous chloride catalyst was added. The mixture was brought to a temperature of about 225-243° C., and the esterification reaction was allowed to continue for about 3.5 hours. In other respects the esterification process was the same. Upon completion of the esterification reaction, the mixture was neutralized with about 1% citric acid for about 30 minutes. The neutralized mixture was treated with 0.25% Trisyl S-615, 0.5% Filter Aid, and 0.5% Bleaching clay, and then filtered. It was determined that this reaction went to 54.5% completion. The resulting product contained 18.7 ppm residual stannous chloride catalyst, and 1.74% moisture.

EXAMPLES 4 A-D

Example 4 above was repeated four additional times, but with different post-esterification treatments to reduce the amount of residual stannous chloride in the final product to acceptable levels. The four post-esterification treatments were as follows

EXAMPLE 4A

Mix neutralized esterification reaction product with 0.25% Trisyl S-615, 0.5% Filter Aid, and 0.5% bleaching clay for fifteen minutes, then filter. The end product was 79.9% esterified with 11.40 ppm tin as residual catalyst and 0.02% moisture.

EXAMPLE 4B

Mix neutralized esterification reaction product with 0.25% Trisyl S-615, 0.5% Filter Aid, and 1.0% bleaching clay for fifteen minutes, then filter. The end product was 87.8% esterified with 4.610 ppm tin as residual catalyst and 0.04% moisture.

EXAMPLE 4C

Mix neutralized esterification reaction product with 0.25% Trisyl S-615 and 0.5% Filter Aid for fifteen minutes, then filter. Then add 0.5% Filter Aid and 1.0% Bleaching clay to filtered product, mix for fifteen minutes, then filter again. The end product was 77.4% esterified with 0.80 ppm tin as residual catalyst and 0.06% moisture.

EXAMPLE 4D

Mix neutralized esterification reaction product with 1.0% Trisyl S-615 and 0.5% Filter Aid for ten minutes, then filter. Then add 0.5% Filter Aid and 0.5% Bleaching clay to filtered product, mix for fifteen minutes, then filter again. The end product was 72.5% esterified with <0.50 ppm tin as residual catalyst and 0.02% moisture.

Figure 2:
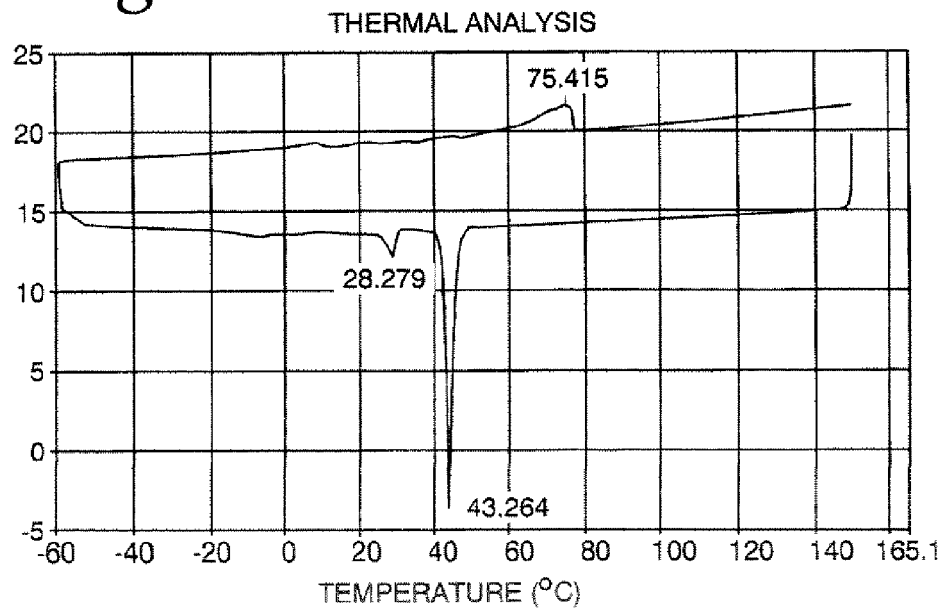

A sample from example 4A was subjected to differential scanning calorimetry analysis as for Example 3 above. The resulting curves are shown in FIG. 2. The melting curve has only one peak at about 75 C. The cooling curve has a very sharp peak at about 43 C, and another smaller peak at about 28 C. The sharp peak in the cooling curve is consistent with a greater degree of esterification. Also, the substantially lower melting point of the product of this example is consistent with the crystal structure more similar to that of fatty acids, and therefore more spreadable and desirable to a consumer.

EXAMPLE 5

A mixture of 55% phytopowder, 40% palm flakes, 3% high oleic canola oil, and 2% glycerin was reacted as in Examples 1-4, at a temperature of about 180-225° C., for a period of about 2.5 hours. Following esterification, the mixture was neutralized with 0.7% citric acid for about 20 minutes. The neutralized esterification reaction product was treated with 0.5% Filter Aid and 0.5% Bleaching clay for about 10 minutes. The end product was 55.5% esterified, with 4.32 ppm tin as residual catalyst and no detectable moisture.

EXAMPLE 6

A mixture of 51% phytopowder, 47% cottenseed flakes, and 2% glycerin were charged to the reaction flask. The mixture was brought to a temperature of about 160° C., and stannous chloride catalyst was added. The mixture was brought to a temperature of about 225-243° C., and the esterification reaction was allowed to continue for about 3.5 hours. In other respects the esterification process was the same. Upon completion of the esterification reaction, the mixture was neutralized with about 1% citric acid for about 30 minutes. The neutralized mixture was treated with 0.25% Trisyl S-615, 0.5% Filter Aid, and 0.5% Bleaching Earth, and then filtered. It was determined that the esterification reaction went to 88.3% completion. The resulting product contained 1.63 ppm tin as residual catalyst, and had no detectable moisture.

Figure 3:
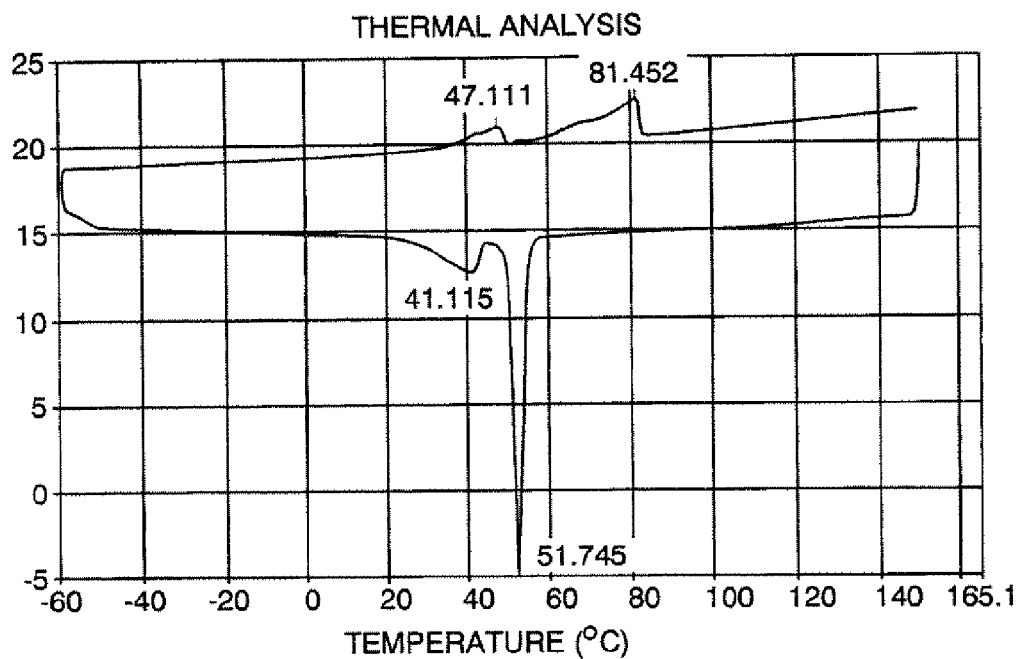

A sample of the product made by this procedure was analyzed by differential scanning calorimetry. The resulting curves are shown in FIG. 3. The melting curve showed a first peak at about 47 C, and a second peak at about 81.5 C. The cooling curve showed a very sharp peak at about 51.8 C, and another peak at about 41 C. These lower melting temperatures and narrower peaks are consistent with a higher degree of esterification and a more spreadable product.

EXAMPLE 7

A mixture of 51% phytopowder, 47% Soya flakes, and 2% glycerin were charged to the reaction flask. The mixture was brought to a temperature of about 160° C., and stannous chloride catalyst was added. The mixture was brought to a temperature of about 225-243° C., and the esterification reaction was allowed to continue for about 3.5 hours. In other respects the esterification process was the same. Upon completion of the esterification reaction, the mixture was neutralized with about 1% citric acid for about 30 minutes. The neutralized mixture was treated with 0.25% Trisyl S-615, 0.5% Filter Aid, and 0.5% Bleaching Earth, and then filtered. It was determined that the esterification reaction went to 90.95% completion. The resulting product contained 1.58 ppm tin as residual catalyst, and had no detectable moisture.

Figure 4:
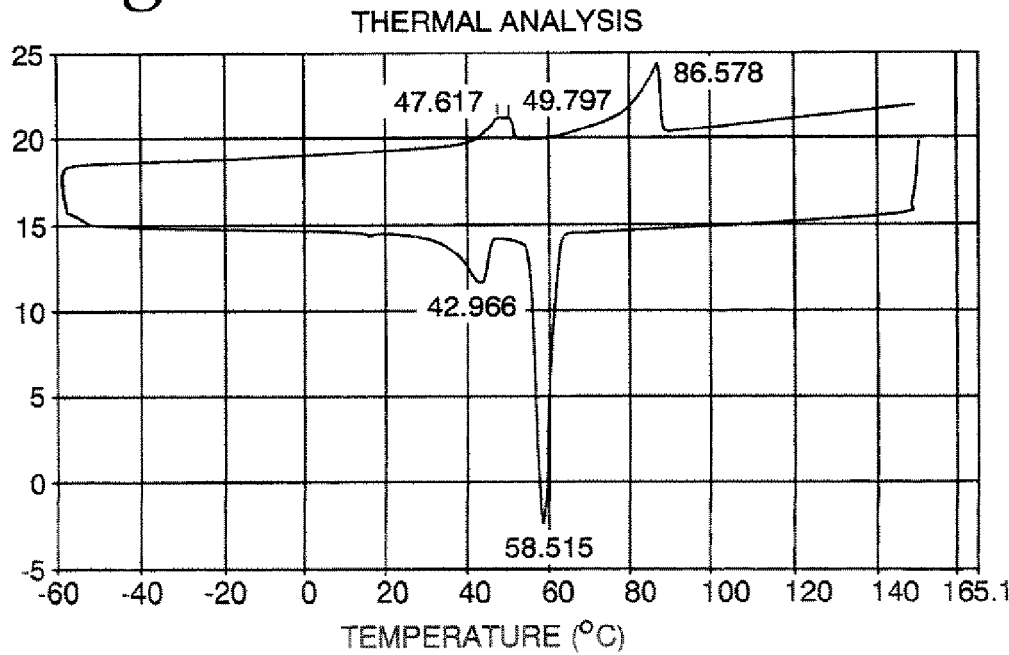

A sample of the product made by this procedure was analyzed by differential scanning calorimetry. The resulting curves are shown in FIG. 4. The melting curve showed a first peak at about 47.6 C, a second curve at about 49.8 C, and a third peak at about 86.5 C. The cooling curve showed a very sharp peak at about 58.5 C, and another peak at about 43 C.

EXAMPLE 8

The procedure of Example 2 was followed identically, except that the palm oil was replaced with cottenseed oil, and the product was subjected to a second filtration step as in Example 4. It was determined that the esterification reaction went to 84.35% completion. The product contained <0.5 ppm, tin as residual catalyst. Cottenseed oil has longer chains than palm oil. This product was softer and more spreadable than the product of Example 2.

Figure 5:
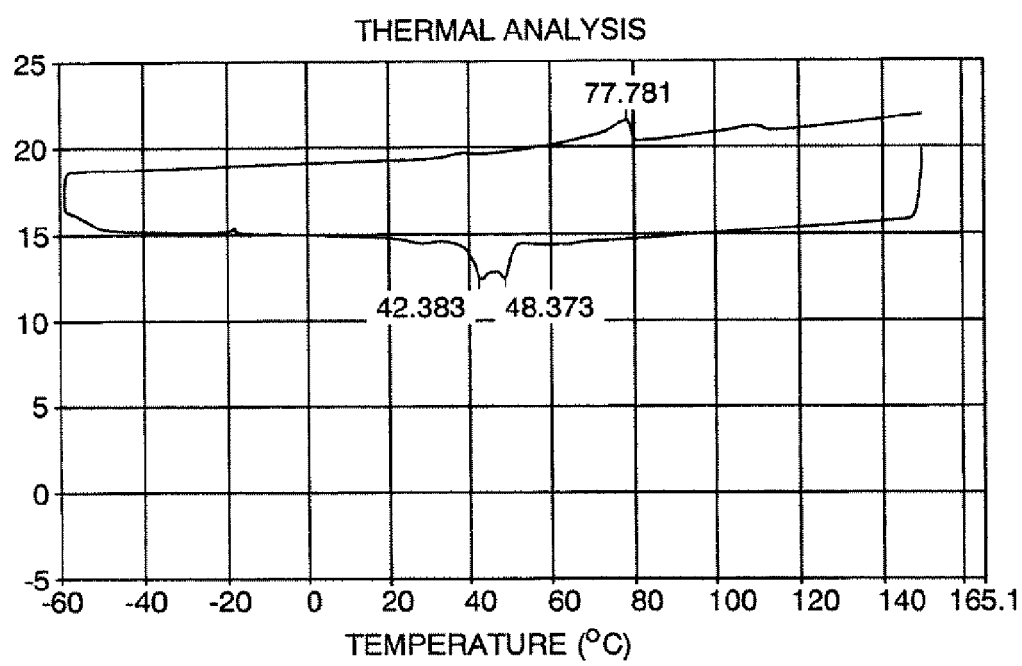

A sample of the product made by this procedure was analyzed by differential scanning calorimetry. The resulting curves are shown in FIG. 5. The melting curve showed a single peak at about 77.8 C. The cooling curve showed a peak at about 48.4 C, and another peak at about 42.33 C.

There has been disclosed an improved phytosterol esterification product that is substantially solid at ambient temperature, and thus is particularly well-suited for use as an ingredient in the manufacture of margarines, bakery shortenings, and the like. As presently understood, it is believed that the presence of the saturated fatty acids in the product poses no threat to health, because the saturated fatty acids are bound to the phytosterol component, which is not readily absorbed by the human digestive system. The use of saturated fatty acids thus provides a product with the desired physical properties, but without the adverse health effects commonly believed to be associated with the use of saturated fatty acids.

The foregoing description of a preferred embodiment of the invention and the method of its manufacture is by way of illustration and by way of limitation. Upon reviewing the foregoing specification, those skilled in the art will appreciate how to modify or adapt the method disclosed herein, such as by adjustments of ingredients, proportions, reaction temperatures, reaction duration, and post-reaction treatments; all such modifications and adaptations and their equivalents are within the scope of the present invention, as set forth in the claims appended hereto.

What is claimed is:

1. A composition suitable for use as an ingredient for a food product consisting essentially of an esterification product of a phytosterol material and a long chain saturated fatty acid, wherein the esterification product has a melting point in the range of about 115-135° C., and has a moisture content of less than 3000 ppm.

2. The composition of claim 1, wherein the esterification is conducted in the absence of a catalyst, such that the composition is catalyst-free.

3. The composition of claim 1, wherein said esterification is conducted with a catalyst, and the amount residual catalyst remaining in the ingredient is less than 10 ppm.

4. The composition of claim 1, wherein the amount of residual catalyst remaining in the ingredient is less than 5 ppm.

5. The composition of claim 1, wherein the amount of residual catalyst remaining in the ingredient is less than 1 ppm.

6. The composition of claim 1, wherein the moisture content is less than 2000 ppm.

7. The composition of claim 1, wherein said phytosterol material is derived from a wood product.

8. The composition of claim 1, wherein said phytosterol is derived from a vegetable oil product.

9. A shortening product for use as a food ingredient, the shortening product comprising the composition of claim 1.

10. The composition of claim 1, wherein said saturated fatty acid comprises palm stearin flakes.

* * * * *